United States Patent [19]
Laugherty

[11] 3,959,503
[45] May 25, 1976

[54] METHOD OF FORMING FRANKFURTERS CONTAINING SEASONING

[76] Inventor: Reba Lorene Laugherty, P.O. Box 132, Knoxville, Tenn. 37901

[22] Filed: May 12, 1975

[21] Appl. No.: 576,747

Related U.S. Application Data

[63] Continuation-in-part of Ser. No. 455,956, March 28, 1974, abandoned, which is a continuation-in-part of Ser. No. 301,533, Oct. 27, 1972, abandoned.

[52] U.S. Cl.................................. 426/283; 426/92; 426/284; 426/513; 426/516
[51] Int. Cl.².................. A21D 13/00; A22C 11/00
[58] Field of Search .............. 426/283, 92, 102, 93, 426/138, 140, 514, 516, 282, 284, 513; 17/41

[56] References Cited
UNITED STATES PATENTS

| | | | |
|---|---|---|---|
| 1,133,054 | 3/1915 | Newcomb | 426/283 X |
| 1,569,121 | 1/1926 | Hall | 426/138 |
| 2,060,490 | 11/1936 | Borbely | 426/92 |
| 2,186,435 | 1/1940 | Serr | 426/92 |
| 2,568,491 | 9/1951 | Edwards | 17/41 X |

OTHER PUBLICATIONS
Kahn; Food Industries, 7-1949; pp. 62, 63; Assembly Line Makes "Mechanized " Sandwiches.

*Primary Examiner*—S. Leon Bashore
*Assistant Examiner*—Kenneth M. Schor
*Attorney, Agent, or Firm*—Burns, Doane, Swecker & Mathis

[57] ABSTRACT

A food product in the form of a frankfurter having an opening through the center thereof is filled with seasoning material substantially from end to end thereof and is sealed at opposite ends.

The emulsion forming the body of the frankfurter may be extruded into a casing in the usual way. The meat emulsion usually has a filler which, when cooked, will cause the emulsion to be stable, allowing the casing to be peeled off. The seasoning material can be extruded from one side into the center of the emulsion and substantially throughout its length. It also should have a filler that will cause it to solidify upon cooking. An adible sealant is used to seal off the seasoning material at opposite ends of the frankfurter as frankfurters are continuously formed (extruded).

The frankfurter is inserted into an elongated dough-type roll having an opening through one end but with the opposite end closed. The opening is of a size and shape substantially to provide a close sliding fit of the frankfurter which may be inserted therein. The roll and frankfurter then may be externally heated before serving.

3 Claims, 8 Drawing Figures

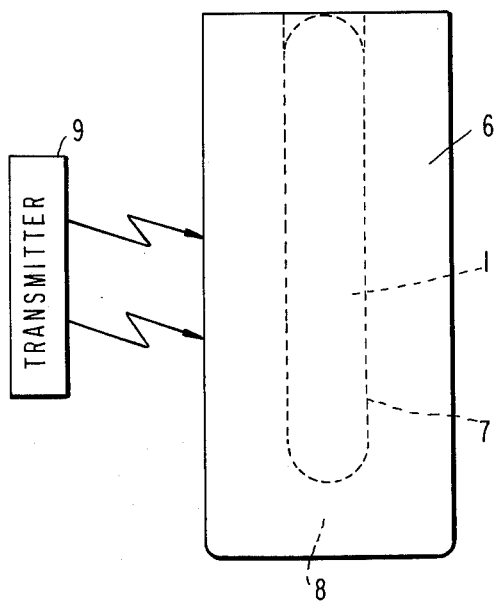
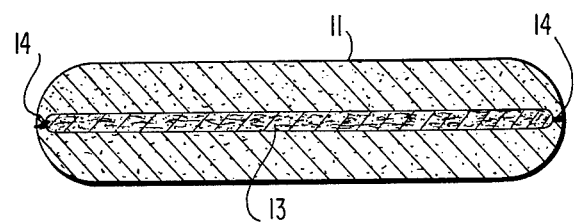
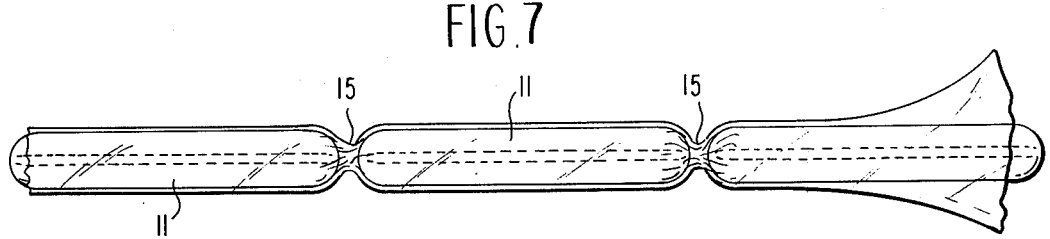
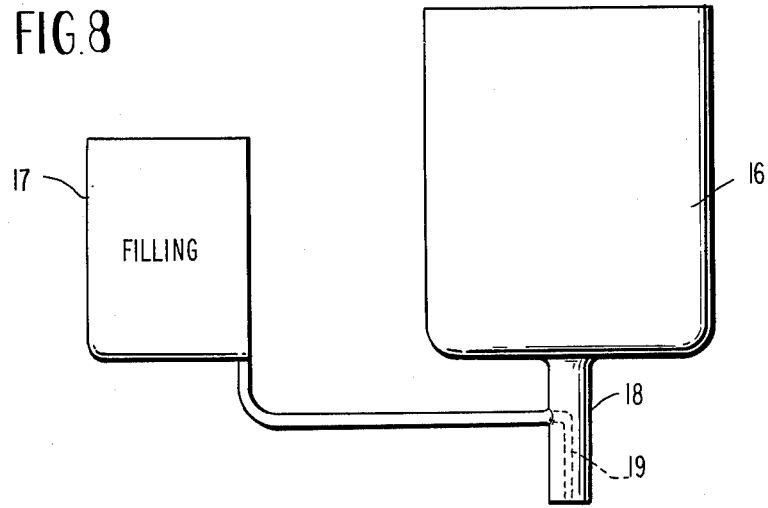

METHOD OF FORMING FRANKFURTERS CONTAINING SEASONING

SUMMARY OF THE INVENTION

This application is a continuation-in-part of my prior application for Food Product, filed Mar. 28, 1974, Ser. No. 455,956, now abandoned, and which was a continuation in part of my prior application for Food Product, Ser. No. 301,533, filed Oct. 27, 1972 and now abandoned.

It is customary to prepare frankfurters of the character commonly termed "hot dogs" as a seasoned beef or beef and pork sausage, usually linked and cooked or smoked in casings or skinless. These are cooked in various manners, to be eaten usually on a roll. Frequently, it is desirable to apply a seasoning material to the frankfurter to enhance the taste hereof, but difficulties are encountered in obtaining a uniform distribution of the seasoning material over the frankfurter as it is consumed in eating.

One object of this invention is to improve the food product by distributing the seasoning material through the frankfurter.

Another object of the invention is to improve the method of making frankfurters to insert the seasoning material therein during formation.

Still another object of the invention is to provide an attractive and desirable food product which has the seasoning material enclosed within the confines thereof such that it is consumed in bites of the frankfurter without attendant running or separation from the meat.

These objects are accomplished, according to certain embodiments of the invention, by providing a frankfurter having an opening axially through the center thereof from end to end of the frankfurter, which opening is substantially filled with seasoning material and is substantially sealed at oppoite ends to confine the seasoning in the frankfurter so as to distribute the flavor thereof along the length of the food product.

BRIEF DESCRIPTION OF DRAWINGS

These embodiments of the invention are illustrated in the accompanying drawings, in which:

FIG. 5 is a side elevation of a food product illustrating diagrammatically the heating thereof;

FIG. 6 is a longitudinal section through the food product, showing a modification in the closure means thereof;

FIG. 7 is a side elevation, showing the food products in the course of being formed; and FIG. 8 is a diagrammatic illustration of forming means for the food products.

DETAILED DESCRIPTION OF DISCLOSURE

The invention is shown in the shape and form of a frankfurter, commonly termed hot dog and which is indicated generally by the numeral 1. The frankfurter is made of seasoned beef or beef and pork and is often linked and cooked or smoked, usually in a casing. The body of the frankfurter 1 is intended to be prepared in the conventional manner for such products, as a mass of meat material, usually of beef or beef and pork, as an emulsion, and having the desired shape.

Figure 1:
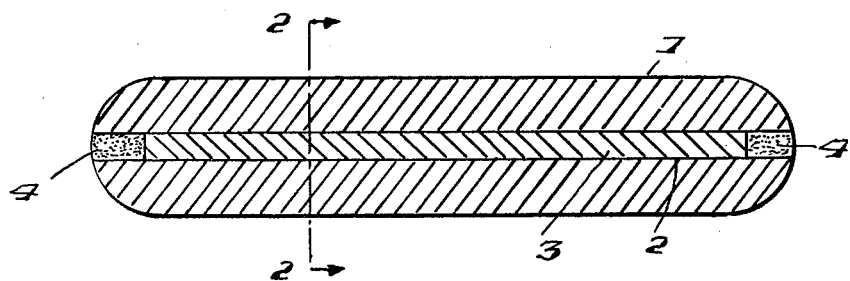
FIG. 1 is a longitudinal section through a frankfurter, showing the seasoning and sealing means applied thereto.
Figure 2:
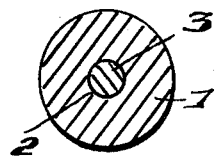
FIG. 2 is a cross section therethrough on the line 2—2 in FIG. 1.
Figure 3:
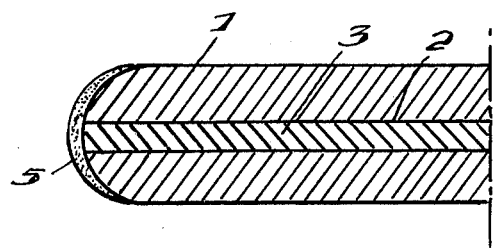
FIG. 3 is a detail longitudinal section, showing a modification.

An opening 2 is formed through the body of the frankfurter 1, from end to end thereof, which opening should be filled with seasoning or flavoring material, indicated generally at 3, as by extruding the seasoning material in intimate contact with the mass of meat material. The filling may extend throughout the length of the opening 2, as indicated in FIG. 3, or terminate just short of the respective ends, as indicated in FIG. 1. This opening is filled with seasoning material such, for example, as mustard, relish, pickle relish, chili, chili sauce, ketchup or cheese, according to the desired taste of the product.

The opposite ends of the opening 2 may be closed and sealed by a suitable edible material, such as gelatin or meat gelatin. In FIG. 1, I have shown the sealing means, indicated at 4, as extending into the opposite ends of the opening 2, confining the seasoning material therebetween. In FIG. 3, the sealing material 5, as described, forms a coating over each end of the frankfurter 1, while the seasoning extends entirely to the ends, as shown. The opening 2 should be sufficiently enlarged so as to allow a desired quantity of seasoning material to be enclosed within the body of the frankfurter.

The filling material may be inserted in any desired manner, as automatically, during the formation of the frankfurter, or injected therein by a suitable needle in preparing the frankfurter for cooking. Telescoped filling spouts may be used for the purpose, the inner one extruding the seasoning material, and the outer one the meat product. Thus, the frankfurters may be formed and filled simultaneously, if desired. No appreciable additional cost would be involved for the enhanced taste provided by the confined seasoning.

The frankfurter may be cooked with the seasoning material contained therein, which will distribute the flavor of the seasoning through the meat of the frankfurter and thus enhance the edibility thereof. At the same time, the seasoning will be confined with the body of the frankfurter without falling off or running in handling. In place of a split roll, the frankfurter can be served in a circular or tubular covering of bread or baked roll, which enhances the desirable properties of the food product.

Figure 4:
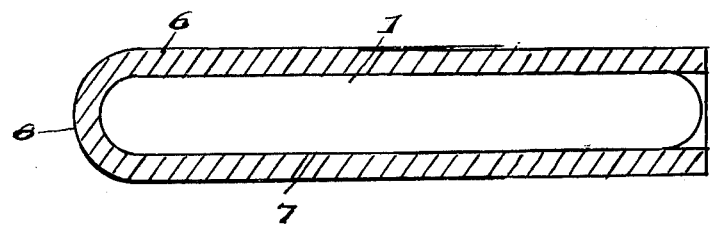
FIG. 4 is a detail longitudinal section, showing the bun or roll for enclosing the frankfurter.

In FIG. 4, I have shown a roll or bun 6, with the frankfurter 1 enclosed therein. The roll or bun 6 is circular in cross section, initially hollow, with an opening 7 extending axially from one end toward the opposite end, which is closed, as indicated at 8, to receive the frankfurter inserted therein.

The roll or bun 6 is of a size to be held cupped in the hand in an upright position with the open end uppermost. Thus, the frankfurter would be retained by the closed lower end without danger of slipping out, as so often happens with split rolls as now used.

The roll 6, with the frankfurter 1 enclosed therein, forms a food product which can be readily handled for eating by being held in the hand or otherwise. It is a composite article which is also capable of being heated readily, individually, by being placed in an oven or subjected to a source of radiant heat or microwave heat from a source indicated at 9 in FIG. 5. These food products can be held in proper refrigerated condition until needed, when they can be readily heated preparatory to consumption or for sale.

In FIG. 6 I have shown a modification of the shape of the frankfurter, here indicated at 11, with a filling 13 of suitable seasoning material, as described above, extending substantially throughout the length of the body of meat substance forming the frankfurter. At the opposite ends of the frankfurter 11, the end portions of the meat substance is constricted over the ends of the seasoning substance 13 in the formation thereof, by squeezing or clamping, as indicated at 14, thus substantially closing the ends of the opening through the frankfurter in which the seasoning substance is enclosed and holding the latter spaced from the ends of the frankfurter.

Frankfurters can be formed with an added cellulose envelope or casing in links, as illustrated in FIG. 7. The constricted portions 14 can be formed by compressing or twisting the material at intervals along the length of the chain of frankfurters, as indicated at 15 in FIG. 7 and after cooking in the conventional way as described above, the cellulose cover or casing may be peeled off, leaving the frankfurters in individual relation, capable of being packed and used as described above.

Forming apparatus for the frankfurters is illustrated diagrammatically in FIG. 8 as an example of the means used for forming the product. This apparatus comprises a tank 16 for containing the meat emulsion to be used in forming the body of the frankfurter and a separate container 17 for the seasoning material. A spout 18 extends from the tank 16 which surrounds a spout 19, in telescoped relation therewith, which is connected through a wall of the spout 18 with the container 17. These spouts 18 and 19 feed into a casing, such as a tube of cellulose, or other suitable material and extrude therein the meat emulsion forming the body of the frankfurter and simultaneously therewith the filling substance which is disposed axially of the meat emulsion and thus will be at the center of the formed frankfurter in intimate relation thereto.

One method of inserting the filling material is by hand. The center of a formed frankfurter is reamed out from end to end. The seasoning material 2 or 13 is forced into the formed opening in a measured quantity less than that required to fill the entire opening. Then the end plugs 4 can be inserted in opposite ends. These plugs can be of meat emulsion or other suitable edible material, preferably having a filler which will cause it to solidify under cooling, thereby effectively sealing the seasoning material spaced from the ends.

Another method of sealing the seasoning material is by extruding the meat emulsion into a suitable casing as described in connection with FIG. 8. The seasoning material is pumped through the center tube 19 in timed relation with the feeding of the meat emulsion through the tube 18. After a measured quantity of seasoning material has been fed there through, there is alternated therewith a quantity of edible plug material fed from the receptacle 16 or a separate source of supply, under properly timed controls, which may be a meat emulsion or a capsule which would subsequently release its sealing material in the usual subsequent treating and linking process. Thus, by properly timing the feeding of the flavoring material in proportion to the meat emulsion therearound and alternating the seasoning material with the filler material in the form of slugs, capsules or the like, the seasoning material will be located and confined within each respective frankfurter spaced from the opposite ends thereof and sealed therein.

Suitable means may be provided for maintaining the proper temperature of the respective substances. For example, the meat emulsion should be kept at a temperature of 40° F. while the seasoning substance should be kept at a somewhat higher temperature of approximately 60° F. so as to provide for the proper extrusion thereof forming a pencil-like quantity of seasoning material in the center of the formed frankfurters. Any suitable pressure means may be used for forcing the material out of the respective containers and through the forming nozzles as, for example, air pressure, screw means, a pump, etc. The higher temperature of the seasoning material tends to prevent the tallow from setting up in the meat emulsion.

After the casing is filled, the product may be cooked in the usual way as, for example, for a period of two hours, after which is it cooled to approximately 40° when the casing is then pealed off. This may be varied as needed according to the character of the meat emulsion and also the nature of the seasoning substance used. The food products should be kept refrigerated until they are to be sold or used and may be inserted within the rolls 6 before being sold or before storage, as desired.

This makes a very attractive and desirable food product which is easily handled and prepared for sale or for use.

While the invention has been illustrated and described in certain embodiments, it is recognized that variations and changes may be made therein without departing from the invention.

I claim:

1. A process of forming a meat product by extruding an elongated mass of edible meat material to be divided into frankfurter lengths, comprising depositing an edible sealing substance in the extruded meat material to be disposed at one end of one frankfurter, extruding a mass of edible flavoring material through the meat material concurrently with the extrusion of the latter and throughout substantially the length of the latter where said flavoring material passes substantially through the center of the extruded material, depositing a second mass of edible sealing material in position to be disposed at the opposite end of the frankfurter sealing the flavoring material therein, depositing a third mass of edible sealing material in the extruded meat material adjacent the second mass thereof in position to be disposed at the end of a second frankfurter, squeezing the extruded masses of meat material between the second and third masses of sealing materials to separate the meat material into frankfurter lengths, and continuing the extrusion and depositing to form additional frankfurter lengths each containing a mass of seasoning material substantialy throughout the length thereof sealed at opposite ends.

2. A process of forming a meat product according to claim 1 wherein the edible seasoning material is selected from the class consisting of mustard, relish, pickle relish, chili, chili sauce, ketchup and cheese.

3. A process of forming a meat product according to claim 1, wherein one of the frankfurters is inserted into an elongated hollow roll closed at one end and subjected to radiant heat preparatory to consumption.

* * * * *